United States Patent
Yoon et al.

(10) Patent No.: US 8,360,692 B2
(45) Date of Patent: Jan. 29, 2013

(54) APPARATUS FOR TRANSFERRING SLURRY

(75) Inventors: Chi-Ho Yoon, Daejeon (KR); Young-Ju Kim, Gyeongsangnam-do (KR); Yong-Chan Park, Daejeon (KR); Young-Kyu Hwang, Gyeonggi-do (KR)

(73) Assignee: Korea Institute of Geoscience and Minderal Resources (KIGAM), Daejeon (KR)

( * ) Notice: Subject to any disclaimer, the term of this patent is extended or adjusted under 35 U.S.C. 154(b) by 475 days.

(21) Appl. No.: 12/457,221

(22) Filed: Jun. 4, 2009

(65) Prior Publication Data

US 2009/0304462 A1 Dec. 10, 2009

(30) Foreign Application Priority Data

Jun. 5, 2008 (KR) .................. 10-2008-0053140

(51) Int. Cl.
*B65G 53/28* (2006.01)
(52) U.S. Cl. .............. 406/106; 406/11; 406/19; 406/47; 406/54; 406/55; 406/124; 406/140; 406/151

(58) Field of Classification Search .............. 406/11, 406/19, 21, 47, 48, 54, 55, 106, 124, 140, 406/151, 152; 141/67, 68
See application file for complete search history.

(56) References Cited

U.S. PATENT DOCUMENTS

| | | | | |
|---|---|---|---|---|
| 4,192,746 A | * | 3/1980 | Arvanitakis | 210/804 |
| 4,410,106 A | * | 10/1983 | Kierbow et al. | 222/135 |
| 6,073,709 A | * | 6/2000 | Hensley | 175/207 |
| 6,551,462 B2 | * | 4/2003 | Prough et al. | 162/243 |
| 6,640,912 B2 | * | 11/2003 | Reddoch | 175/217 |
| 6,926,101 B2 | * | 8/2005 | deBoer | 175/70 |
| 7,062,206 B2 | * | 6/2006 | Fujii et al. | 399/258 |
| 7,306,057 B2 | * | 12/2007 | Strong et al. | 175/66 |
| 7,337,708 B2 | * | 3/2008 | Rothamel et al. | 99/450.7 |
| 7,416,671 B2 | * | 8/2008 | Bozak et al. | 210/708 |
| 7,923,552 B2 | * | 4/2011 | Jackson et al. | 536/124 |
| 7,992,654 B2 | * | 8/2011 | deBoer | 175/66 |

* cited by examiner

*Primary Examiner* — Joseph A Dillon, Jr.
(74) *Attorney, Agent, or Firm* — Clark & Brody

(57) ABSTRACT

Provided is an apparatus for transferring slurry, which is used to transfer minerals from the bottom of the sea to the ground; and, more particularly, to an apparatus for transferring slurry, which can efficiently transfer the slurry in the state of a solid-liquid mixture containing the minerals without clogging of a transfer pipe.

6 Claims, 3 Drawing Sheets

APPARATUS FOR TRANSFERRING SLURRY

CROSS-REFERENCE(S) TO RELATED APPLICATIONS

The present invention claims priority of Korean Patent Application No. 10-2008-0053140, filed on Jun. 5, 2008, which is incorporated herein by reference.

BACKGROUND OF THE INVENTION

1. Field of the Invention

The present invention relates to an apparatus for transferring slurry, which is used to transfer minerals from the bottom of the sea to the ground; and, more particularly, to an apparatus for transferring slurry, which can efficiently transfer the slurry in the state of a solid-liquid mixture containing the minerals without clogging of a transfer pipe.

2. Description of Related Art

Rich mineral resources such as manganese, cobalt, nickel and copper are laid under the bottom of the sea in the state of solid oxides or sulfides, there have been various efforts to mine the mineral resources and then transfer them to the ground.

However, the mineral resources mined from the deep sea are stored in a collecting container and then pumped to the ground. In this case, since the mineral resources are transferred in the state of slurry containing nodules, sea water and the like, there is a problem that it may be difficult to transfer the slurry to the ground due to clogging of a transfer pipe.

SUMMARY OF THE INVENTION

An embodiment of the present invention is directed to providing an apparatus for transferring slurry, which is used to transfer useful minerals lain under the bottom of the sea to the ground in the state of solid-liquid slurry.

Another embodiment of the present invention is directed to providing an apparatus for transferring slurry, which has a middle storing container and a cleaning system so as to prevent clogging of a transfer pipe when transferring the minerals in the state of the slurry from the bottom of the sea to the ground. Another embodiment of the present invention is directed to providing an apparatus for transferring slurry, which has a direction changing valve and a nodule content sensor for sensing a nodule content in the slurry discharged from a screw feeder so as to prevent the clogging of the transfer pipe.

Another embodiment of the present invention is directed to providing an apparatus for transferring slurry, which has a direction changing valve and a nodule content sensor for sensing a nodule content in the slurry discharged from a screw feeder so as to prevent the clogging of the transfer pipe. To achieve the object of the present invention, the present invention provides an apparatus for transferring slurry, including a middle storing container; a first transferring line which is connected to a first pump and functions to transfer the slurry stored in a collecting container to the middle storing container; a second transferring line which is connected to a second pump and functions to transfer the slurry discharged from a front end of a screw feeder to a slurry storing container; a direction changing valve which is provided at the second transferring line; and a third transferring line which is connected to the direction changing valve and arranged to be parallel with the second transferring line so that the slurry discharged from the screw feeder is selectively introduced therein by operation of the direction changing valve.

Preferably, the apparatus for transferring slurry further includes an injection nozzle for removing the slurry attached to the screw feeder.

Preferably, the apparatus for transferring slurry further includes a nodule content sensor for sensing a nodule content contained in the slurry discharged from the front end of the screw feeder; and a control part which is connected with the direction changing valve so as to transfer the slurry discharged from the screw feeder to the third transferring line when the nodule content in the slurry discharged from the screw feeder is larger than a predetermined value.

Preferably, the nodule content sensor is provided between the front end of the screw feeder and the direction changing valve.

Preferably, the control part controls a first motor for driving the first pump and a second motor for driving the second pump with a constant rotational ratio.

Therefore, in case that there is something wrong with the transferring of the slurry through the second transferring line, the direction changing valve 160 is operated by the control part so that the slurry is transferred through the third transferring line to the collecting container or other place, thereby protecting the apparatus for transferring slurry.

Further, since the present invention has the cleaning unit including the injection nozzle, it is possible to remove the slurry attached in the screw feeder.

Further, since the control part is connected with the first and second motors to control them with a constant rotational ratio, it is possible to control a transfer amount of the nodule content contained in the slurry discharged through the screw feeder.

Furthermore, since the nodule content sensor is provided between the direction changing valve and the screw feeder, it is possible to measure and control the nodule content proper to the transferring of the nodule.

[Detailed Description of Main Elements]

Figure 1:
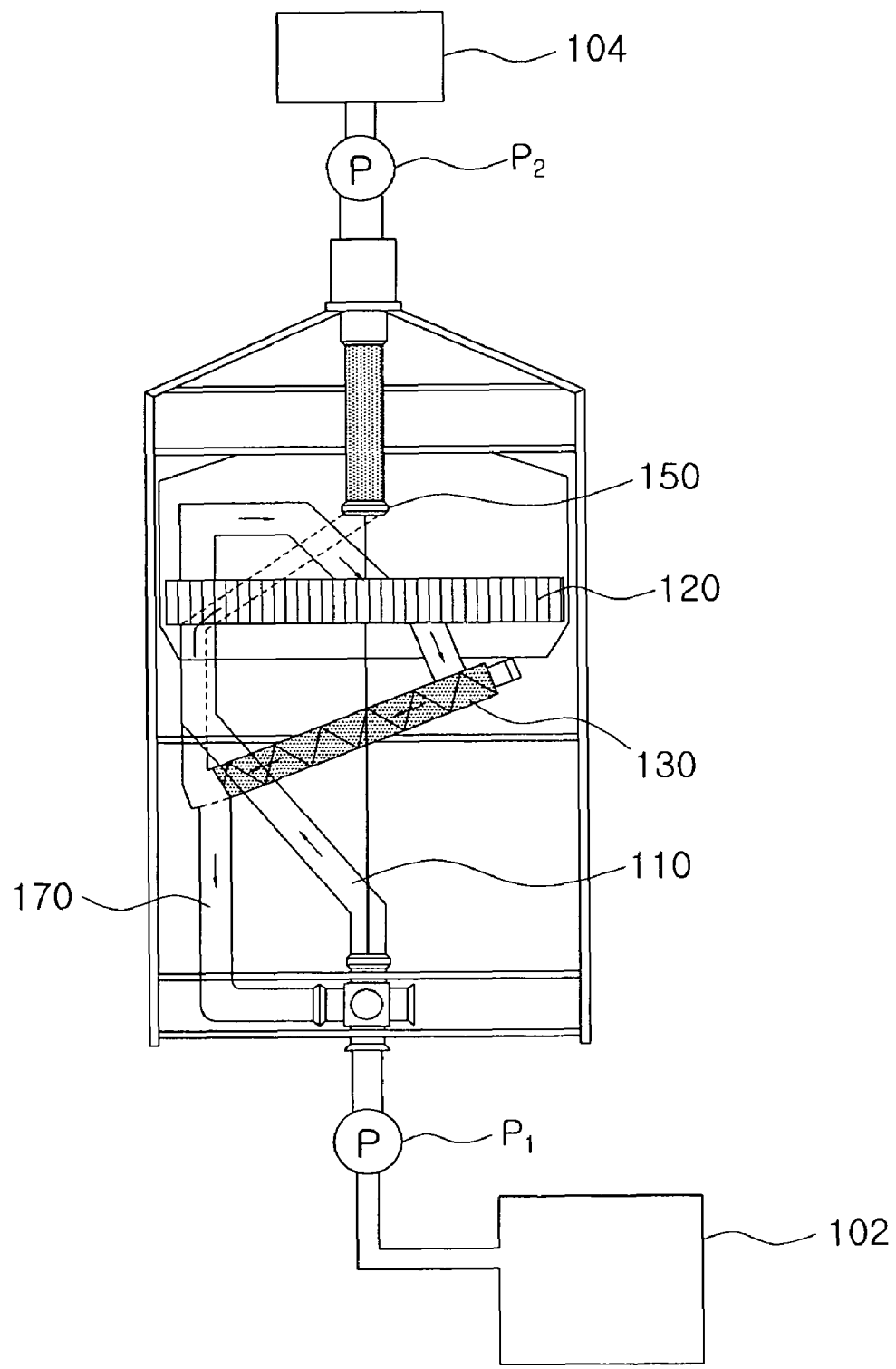
FIG. 1 is a schematic view showing a structure of an apparatus for transferring slurry in accordance of an embodiment of the present invention.

P1: first pump
P2: second pump
102: collecting container
104: slurry storing container
110: first transferring line
120: middle storing container
130: screw feeder
132: screw shaft
134: screw
140: cleaning unit
141: nozzle pipe
142: injection nozzle
150: second transferring line
160: direction changing valve -continued

[Detailed Description of Main Elements]

170: third transferring line
180: nodule content sensor
190: control part
201: first motor
202: second motor

DESCRIPTION OF SPECIFIC EMBODIMENTS

The advantages, features and aspects of the invention will become apparent from the following description of the embodiments with reference to the accompanying drawings, which is set forth hereinafter.

Figure 2:
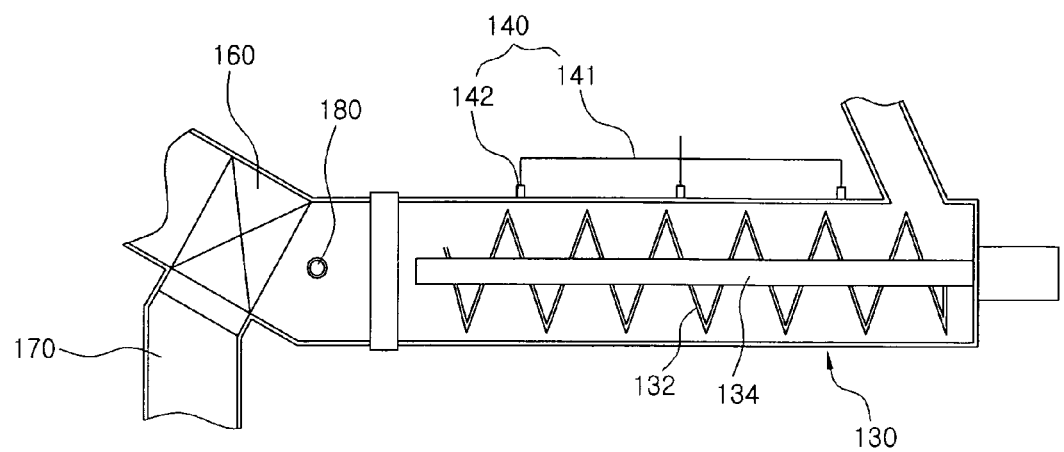
FIG. 2 is a schematic view showing a main part of the apparatus for transferring slurry in accordance with the embodiment of the present invention.
Figure 3:
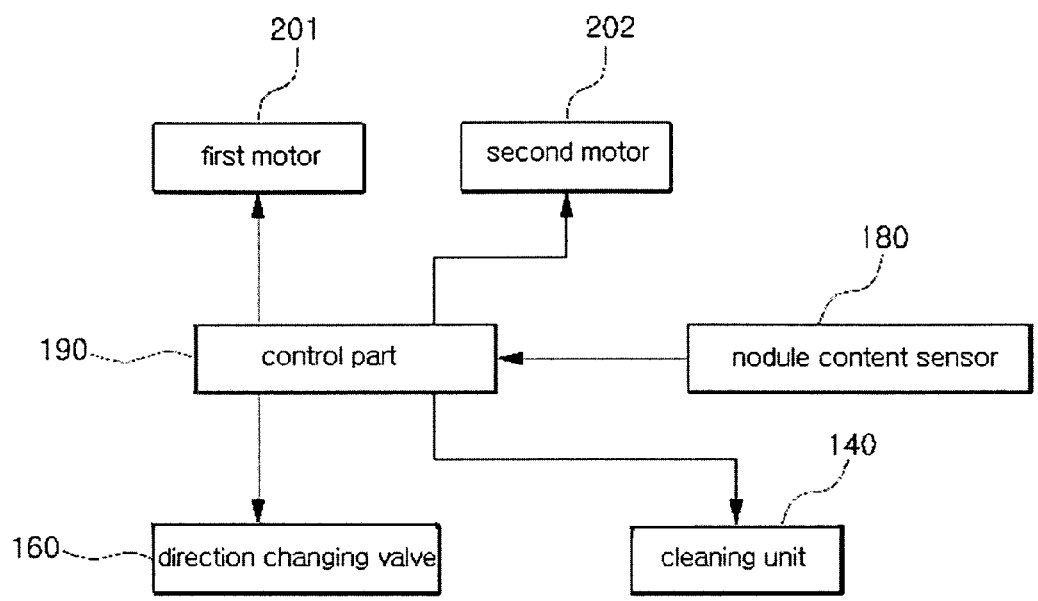
FIG. 3 is a block diagram showing a construction of the apparatus for transferring slurry in accordance with the embodiment of the present invention.

FIG. 1 is a schematic view showing a structure of an apparatus for transferring slurry in accordance of an embodiment of the present invention and FIG. 2 is a schematic view showing a main part of the apparatus for transferring slurry in accordance with the embodiment of the present invention. FIG. 3 is a block diagram showing a construction of the apparatus for transferring slurry in accordance with the embodiment of the present invention.

Referring to FIG. 1, an apparatus for transferring slurry in accordance of an embodiment of the present invention includes a first transferring line 110, a middle storing container 120, a screw feeder 130, a cleaning unit 140, a second transferring line 150, a direction changing valve 160, and a third transferring line 170.

Referring to FIG. 1, a lower end of the first transferring line 110 is connected to a collecting container 102. The collecting container 102 stores slurry in the state of a solid-liquid mixture containing mineral nodule collected from the deep sea.

The first transferring line 110 is provided with a first pump P1.

An upper end of the first transferring line 110 is connected to the middle storing container 120. The slurry stored in the collecting container 102 is transferred through the first transferring line 110 to the middle storing container 120 by the first pump P1.

Referring to FIGS. 1 and 2, a rear end of the screw feeder 130 is connected to the middle storing container 120 so that the slurry stored in the middle storing container 120 is introduced therein. The screw feeder 130 is provided with a screw shaft 132 and a screw 134 that is disposed at the screw shaft 132 to be rotated integrally.

Referring to FIG. 2, the cleaning unit 140 is disposed at the screw feeder 130, and includes an injection nozzle 142 and a nozzle pipe 141. The injection nozzle 142 may be provided in plural. High pressure gas or liquid is injected through the injection nozzle 142 into the screw feeder 130 so as to remove the slurry attached to the screw feeder 142. The injection nozzles 142 may be disposed at regular intervals, and the intervals may be the same as or less than a pitch of the screw 134.

Referring to FIGS. 1 and 2, a lower end of the second transferring line 150 is connected with a front end of the screw feeder 130 so that the slurry discharged from the front end of the screw feeder 130 is introduced therein.

Referring to FIG. 1, the second transferring line 150 is provided with a second pump P2.

An upper end of the second transferring line 150 is connected to a slurry storing container 104. The slurry discharged from the screw feeder 130 is transferred through the second transferring line 120 to the slurry storing container 104 by the second pump P2.

Referring to FIG. 2, the direction changing valve 160 is disposed at a rear end of the second transferring line 150. A rear end of a third transferring line 170 is connected to the direction changing valve 160 to be parallel with the second transferring line 150. Therefore, the slurry discharged from the screw feeder 130 may be selectively introduced to the third transferring line 170 by operation of the direction changing valve 160. In other words, the slurry discharged from the screw feeder 130 may be transferred to the collecting container 102 or other place through the third transferring line 170.

Referring to FIG. 2, a nodule content sensor 180 may be provided between the direction changing valve 160 and the screw feeder 130. The nodule content sensor 180 senses a mineral nodule content in the slurry discharged from the front end of the screw feeder 130.

Referring to FIG. 3, the apparatus for transferring slurry in accordance of an embodiment of the present invention further includes a control part 190.

The control part 190 is connected with the nodule content sensor 180 and the direction changing valve 160. When it is determined by a signal from the nodule content sensor 180 that the nodule content in the slurry discharged from the screw feeder 130 is larger than a predetermined value, the control part 190 controls the direction changing valve 160 so that the slurry is transferred to the collecting container 102 or other place through the third transferring line 170.

Referring to FIG. 3, the control part 190 is also connected with a first motor 201 for driving the first pump P1 (referring to FIG. 1) and a second motor 202 for driving the second pump P2. The control part 190 controls the first and second motors 201 and 202 with a constant rotational ratio, and the rotational ratio may be changed. For example, the rotational ratio of the first and second motors 201 and 202 may be changed according to the nodule content sensed by the nodule content sensor 180.

Referring to FIG. 3, the control part 190 is connected with the cleaning unit 140. The cleaning unit 140 is driven to remove the slurry attached in the screw feeder 130 by the control part 190.

According to the present invention, in case that there is something wrong with the transferring of the slurry through the second transferring line 150, the direction changing valve 160 is operated by the control part 190 so that the slurry is transferred through the third transferring line 170 to the collecting container 102 or other place, thereby protecting the apparatus for transferring slurry.

Further, since the present invention has the cleaning unit 140 including the injection nozzle 142, it is possible to remove the slurry attached in the screw feeder 130.

Further, since the control part 190 is connected with the first and second motors 201 and 202 to control them with a constant rotational ratio, it is possible to control a transfer amount of the nodule content contained in the slurry discharged through the screw feeder 130.

Furthermore, since the nodule content sensor 180 is provided between the direction changing valve 160 and the screw feeder 130, it is possible to measure and control the nodule content proper to the transferring of the nodule.

While the present invention has been described with respect to the specific embodiments, it will be apparent to those skilled in the art that various changes and modifications may be made without departing from the spirit and scope of the invention as defined in the following claims.

What is claimed is:

1. An apparatus for transferring slurry, comprising:
a collecting container connected to a first pump, the collecting container storing a slurry;
a middle storing container;
a first transferring line which connects the first pump to the middle storing container, the first transferring line transferring slurry stored in the collecting container to the middle storing container;
a screw feeder which is connected to the middle storing container at a rear end of the screw feeder;
a slurry storing container connected to a second pump;
a second transferring line which connects a front end of the screw feed to the second pump, the second transferring line transferring slurry discharged from the front end of the screw feeder to the slurry storing container;
a direction changing valve which is provided at the second transferring line; and
a third transferring line which is connected to the direction changing valve and arranged to be parallel with the second transferring line, the third transferring line selectively receiving slurry discharged from the screw feeder by operation of the direction changing valve for slurry recycle from the third transferring line to the first transferring line or recycle from the third transferring line to the collection container.

2. The apparatus of claim 1, further comprising:
an injection nozzle for removing the slurry attached to the screw feeder.

3. The apparatus of claim 1, further comprising:
a nodule content sensor for sensing a nodule content contained in the slurry discharged from the front end of the screw feeder; and
a control part which is connected with the direction changing valve so as to transfer the slurry discharged from the screw feeder to the third transferring line when the nodule content in the slurry is larger than a predetermined value.

4. The apparatus of claim 3, wherein the nodule content sensor is provided between the front end of the screw feeder and the direction changing valve.

5. The apparatus of claim 3, wherein the control part controls a first motor for driving the first pump and a second motor for driving the second pump with a constant rotational ratio.

6. The apparatus of claim 4, wherein the control part controls a first motor for driving the first pump and a second motor for driving the second pump with a constant rotational ratio.

* * * * *